United States Patent
Yamanoi et al.

(10) Patent No.: US 6,982,941 B2
(45) Date of Patent: Jan. 3, 2006

(54) MIRROR DETECTION SIGNAL GENERATOR

(75) Inventors: Koyu Yamanoi, Funabashi (JP);
Hironobu Murata, Yokohama (JP);
Toshio Yamauchi, Yokohama (JP)

(73) Assignee: Texas Instruments Incorporated, Dallas, TX (US)

( * ) Notice: Subject to any disclaimer, the term of this patent is extended or adjusted under 35 U.S.C. 154(b) by 442 days.

(21) Appl. No.: 10/072,100

(22) Filed: Feb. 8, 2002

(65) Prior Publication Data

US 2003/0152000 A1 Aug. 14, 2003

(30) Foreign Application Priority Data

Mar. 2, 2001 (JP) .............................. 2001-059294

(51) Int. Cl.
*G11B 7/09* (2006.01)

(52) U.S. Cl. .............................. 369/53.22; 369/124.15

(58) Field of Classification Search .............. 369/53.2, 369/53.22, 59.15, 59.17, 53.32, 124.15, 47.14, 369/53.31, 124.11, 53.15, 55.22
See application file for complete search history.

(56) References Cited

U.S. PATENT DOCUMENTS

| | | | | |
|---|---|---|---|---|
| 4,924,447 A | * | 5/1990 | Fuji et al. .................. 369/13.02 |
| 5,150,346 A | * | 9/1992 | Minakuchi ................ 369/44.36 |
| 5,175,719 A | * | 12/1992 | Iimura ....................... 369/44.29 |
| 5,231,280 A | * | 7/1993 | Imakawa ................... 250/201.5 |
| 6,288,988 B1 | * | 9/2001 | Kumagai ................... 369/44.29 |
| 6,366,549 B1 | * | 4/2002 | Lee et al. .............. 369/112.05 |
| 6,768,707 B1 | * | 7/2004 | Kubogata ................. 369/53.11 |

* cited by examiner

*Primary Examiner*—William Klimowicz
*Assistant Examiner*—Lixi Chow
(74) *Attorney, Agent, or Firm*—William B. Kempler; W. James Brady, III; Frederick J. Telecky, Jr.

(57) ABSTRACT

An amplitude variation detection circuit that can reliably detect the mirror portion independently of the type of optical recording medium, as well as a type of information regenerating apparatus that contains said amplitude variation detecting circuit. Voltage division of top envelope signal Ste and bottom-hold signal Sbh of RF signal Srf is performed by voltage divider (16); then, after amplification by gain control amplifier (19) with a gain that corresponds to the type of optical disc (1), a prescribed offset is added by offset circuit (22) to the signal, and the resulting signal is input as mirror detection threshold signal Smt to comparator (24). The high-frequency noise component of bottom envelope signal Sbe of RF signal Srf is removed by low-pass filter (21); after amplification by gain control amplifier (20) with a gain that corresponds to the type of optical disc (1), the signal is input to comparator (24). Depending on the result of the comparison of the level of said amplified bottom envelope signal S4 with that of mirror detection threshold signal Smt, mirror detection signal Sm is generated.

12 Claims, 8 Drawing Sheets

MIRROR DETECTION SIGNAL GENERATOR

FIELD OF THE INVENTION

The present invention pertains to a type of mirror [surface] detection signal generator for detecting the mirror portion of an optical recording medium from variations in the RF signal amplitude read by an optical pickup during regeneration of the optical recording medium.

BACKGROUND OF THE INVENTION

On CD (Compact Disc) or DVD (Digital Versatile Disc), or other disk type optical recording medium (hereinafter referred to as optical disc), multiple narrow bumps known as bits having a length corresponding to the recorded data are formed on the recording surface of the disc irradiated with a laser beam. The bits are configured in a spiral composed of columns arranged on the recording surface from the center to the periphery corresponding to the recording order of data. When the recorded data are read from the optical disc, a laser beam is irradiated on the bit columns. The intensity of the irradiated laser beam is lower when the laser beam spot is on a bit than when it is on the flat surface area outside the bits. The intensity of the reflected light is converted into an electronic signal by means of a photodiode or other optical detector. In this way, the information recorded on the optical disc is electrically regenerated. The electronic signal output corresponding to the intensity of reflected light from the optical detector is modulated at a high frequency in accordance with whether or not the laser spot is on a bit area. Consequently, it is also called "RF signal."

Each completed revolution of the bit columns arranged side by side in a spiral configuration is called a track. In the regenerating apparatus of an optical disc, such as a CD, DVD, etc., there is a function that allows regeneration of the recorded data by skipping said tracks. One of characteristic feature of the disc type optical recording medium is that regeneration can be performed at higher speed than a tape type recording medium.

In order to jump over tracks so as to regenerate the information recorded on the desired position of the disc, it is necessary to know the present track where the laser beam spot is located and the target track to be reached by the laser beam spot after jumping over a prescribed number of tracks. In a conventional optical disc regenerating apparatus, there is a circuit known as a mirror detection circuit that detects whether the light spot is on a track or on the flat mirror portion outside the tracks. As the laser beam spot passes over the tracks, the number of track portions and mirror portions is counted by the mirror detection circuit, which detects these alternating portions. In this way, the number of the tracks that have been traversed is known.

Figure 5:
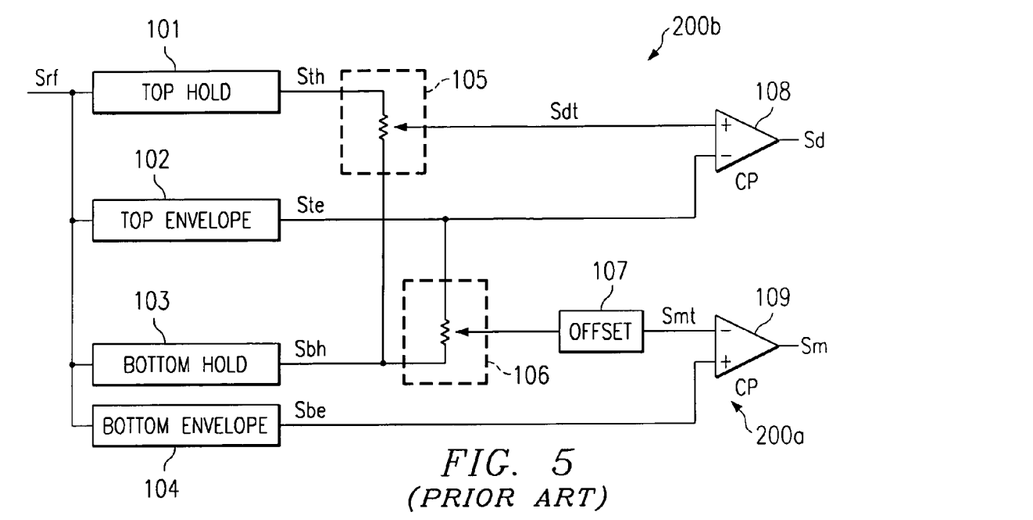
FIG. 5 is a schematic block diagram illustrating an example of the constitution of the conventional mirror detecting circuit and defect detecting circuit.

FIG. 5 is a schematic block diagram illustrating an example of the constitution of a conventional mirror detecting circuit and defect detecting circuit.

Mirror detecting circuit (200a) shown in FIG. 5 has peak-hold circuit (102), peak-hold circuit (104), voltage divider (106), offset circuit (107), and comparator (109). Also, defect detecting circuit (200b) shown in FIG. 5 has peak-hold circuit (101), voltage divider (105), and comparator (108). Peak-hold circuit (102) and peak-hold circuit (103) are shared with mirror detecting circuit (200a).

Peak-hold circuits (101)–(104) are circuits that hold the maximum peak level (hereinafter referred to as top level) or the minimum peak level (hereinafter referred to as bottom level) of RF signal Srf, the electronic signal obtained by conversion using an optical detector. Peak-hold circuits (101) and (102) hold the top level of RF signal Srf, while peak-hold circuits (103) and (104) hold the bottom level of RF signal Srf.

Also, the droop rate that indicates the rate of attenuation of the hold level of the peak-hold circuit with lapse of time is set individually for each peak-hold circuit. Properties of the signals held in the various peak-hold circuits are different from each other corresponding to values of the droop rates.

The droop rate of peak-hold circuit (101) is set relatively low for output of top-hold signal Sth that keeps a constant top level for RF signal Srf. For example, the droop rate may be set at about 1 msec/V.

The droop rate of peak-hold circuit (102) is set higher than that of peak-hold circuit (101) so that top envelope signal Ste is output corresponding to the envelope that describes the top level of RF signal Srf. For example, the droop rate may be set at about 100 μsec/V.

The droop rate of peak-hold circuit (103) is set relatively low for output of bottom-hold signal Sbh that keeps a constant bottom level for RF signal Srf. For example, the droop rate may be set at about 10 msec/V.

The droop rate of peak-hold circuit (104) is set higher than the rates of peak-hold circuits (102) and (103) so that bottom envelope signal Sbe is output corresponding to the envelope that describes the bottom level of RF signal Srf. For example, the droop rate may be set at about 10 μsec/V.

Voltage divider (105) voltage-divides at a prescribed ratio for top-hold signal Sth of peak-hold circuit (101) and bottom-hold signal Sbh of peak-hold circuit (103), and the obtained defect detection threshold signal Sdt is input to the positive terminal of comparator (108).

Voltage divider (106) divides voltage at a prescribed ratio for top envelope signal Ste of peak-hold circuit (102) and bottom-hold signal Sbh of peak-hold circuit (103), and the obtained signal is input to offset circuit (107).

Offset circuit (107) adds a prescribed offset to the voltage division signal output from voltage divider (106), and the obtained signal is input as mirror detection threshold signal Smt to the negative terminal of comparator (109).

Comparators (108) and (109) compare the magnitudes of the signal levels input to the positive terminal and the negative terminal, and output a signal with a logic value of "1" when the signal level at the positive terminal is higher than that at the negative terminal, and output a signal with a logic value of "0" when the signal level at the positive terminal is lower than that at the negative terminal.

When top envelope signal Ste is smaller than said defect detection threshold signal Smd, comparator (108) outputs defect detection signal Sd with a logic value of "1" to indicate detection of said defect on the optical disc.

When bottom envelope signal Sbe is larger than said mirror detection threshold signal Smt, comparator (109) outputs mirror detection signal Sm with a logic value of "1" to indicate detection of a mirror portion.

In the following, operation of mirror detecting circuit (200a) and defect detecting circuit (200b) having the aforementioned constitution will be explained.

FIG. 6 is a waveform diagram illustrating the operation of mirror detecting circuit (200a) shown in FIG. 5. In the figure, the ordinate represents the signal level, and the abscissa represents time.

Figure 6A:
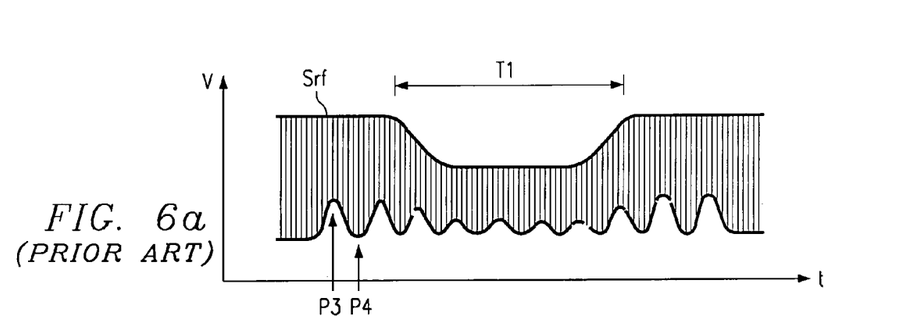
FIG. 6 is a waveform diagram illustrating the operation of the mirror detecting circuit shown in FIG. 5.
Figure 6B:
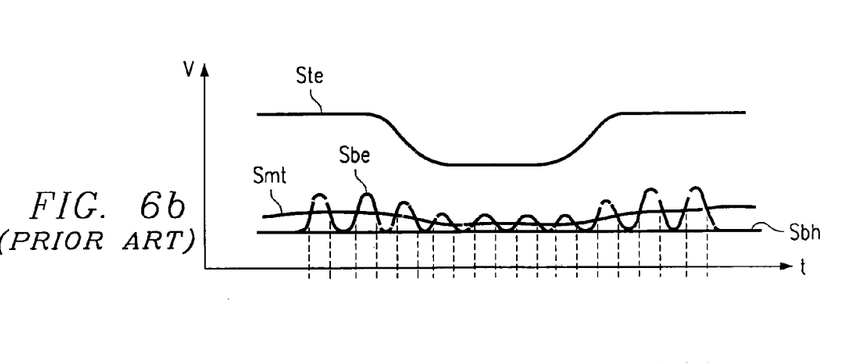
Figure 6C:
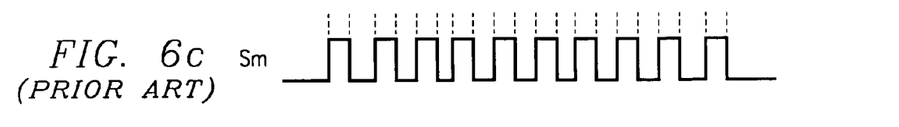

FIG. 6a illustrates a waveform example of RF signal Srf. FIG. 6b shows top envelope signal Ste, bottom-hold signal Sbh, and bottom envelope signal Sbe obtained by peak holding of RF signal Srf shown in FIG. 6a by peak-hold circuits (102)–(104), as well as said mirror detection threshold signal Smt. FIG. 6c illustrates a waveform example of mirror detection signal Sm output from comparator (109).

As shown in FIG. 6a, the signal amplitude of RF signal Srf output from the optical detector will be different when the light spot is on a track and when the light spot is on the mirror portion between tracks.

When the light spot is on a track, as shown at peak position P4 in FIG. 6a, the amplitude of RF signal Srf is higher. This is due to the large difference in the intensity of the reflected light comparing the case when the light spot is on a bit to the case when the light spot is outside the bit region. Also, because the intensity of reflected light corresponds to the lowest level of RF signal Srf when the light spot is directly on a bit, in this case, the bottom level of RF signal Srf is lowest.

On the other hand, when the light spot is on the mirror portion between tracks, as shown at peak position P3 in FIG. 6a, the amplitude of RF signal Srf is smaller, and at the same time, the bottom level is higher. In a conventional optical disc regenerating apparatus, even when the light spot is at the center of the mirror portion, it still partially overlaps the adjacent track, and the intensity of the reflected light in the overlapped portion is modulated, so that there is certain high-frequency modulation component of RF signal Srf even at peak position P3 of the mirror portion, as shown in FIG. 6a.

As shown in FIG. 6b, top envelope signal Ste has a waveform corresponding to the envelope of the top level of RF signal Srf, and bottom envelope signal Sbe has a waveform corresponding to the envelope of the bottom level of RF signal Srf. Also, bottom-hold signal Sbh has a waveform that holds the bottom level of RF signal Srf.

Mirror detection threshold signal Smt is a signal obtained by voltage dividing top envelope signal Ste and bottom-hold signal Sbh using voltage divider (106), and it gives a prescribed offset in offset circuit (107). It has a signal level of a prescribed proportion between top envelope signal Ste and bottom-hold signal Sbh. In the example shown in FIG. 6b, the signal level is between the crest and trough of bottom envelope signal Sbe.

Mirror detection signal Sm is output from signal comparator (109) when bottom envelope signal Sbe is compared with mirror detection threshold signal Smt. In the example shown in FIG. 6c, the output is high (with a logic value of "1") when the signal level of bottom envelope signal Sbe is above mirror detection threshold signal Smt, and low (with a logic value of "0") when it is below the threshold.

When the light spot passes over the region on an optical disc with intensity of reflected light reduced due to the presence of fingerprints, smudges, etc., as shown in period T1 in FIG. 6a, the overall amplitude of RF signal Srf is reduced. In this case, since the amplitudes of top envelope signal Ste and bottom envelope signal Sbe decrease in the same relative proportion, the signal level of mirror detection threshold signal Smt also decreases in the same proportion. That is, even when the amplitude of bottom envelope signal Sbe decreases due to the decrease in the intensity of reflected light caused by smudges, the level of mirror detection threshold signal Smt decreases in the same proportion as that of said decrease in the amplitude, mirror detection can still be performed. Consequently, it is possible to suppress the decrease in the mirror detection sensitivity with respect to smudges on the disc surface.

FIG. 7 is a waveform diagram illustrating the operation of defect detecting circuit (200b) shown in FIG. 5. In this figure, the ordinate represents the signal level, and the abscissa represents time.

Figure 7A:
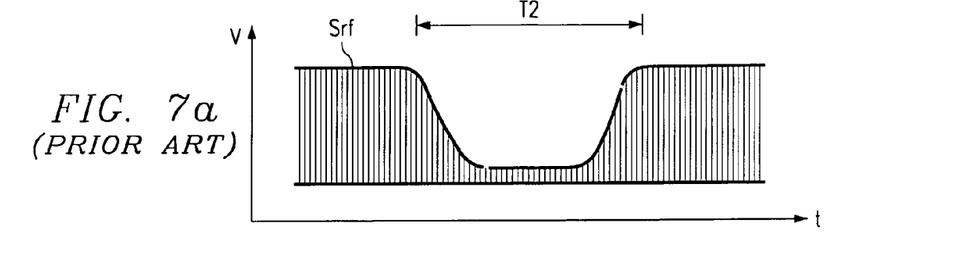
FIG. 7 is a waveform diagram illustrating the operation of the defect detecting circuit shown in FIG. 5.
Figure 7B:
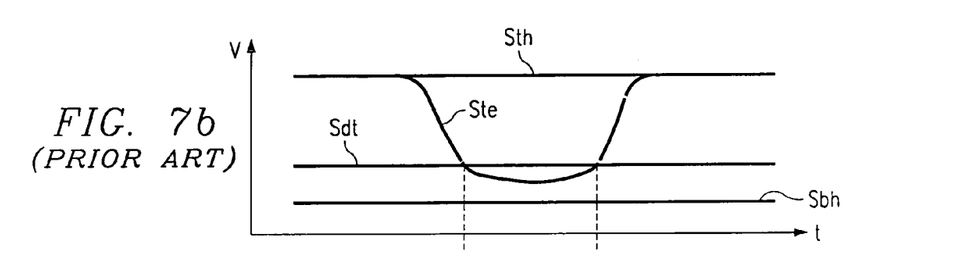
Figure 7C:
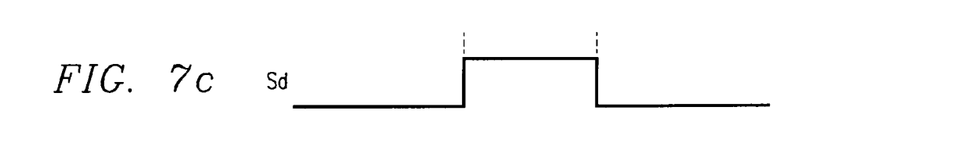

FIG. 7a is a diagram illustrating a waveform example of RF signal Srf. FIG. 7b illustrates waveform example of peak holding signal Sth, top envelope signal Ste and bottom-hold signal Sbh obtained by peak-holding RF signal Srf of FIG. 7a using peak-hold circuits (101)–(103). FIG. 7c illustrates waveform example of defect detection signal Sd output from comparator (108).

In period T2 shown in FIG. 7a, since the light spot passes over the region on the optical disc where the intensity of reflected light decreases significantly due to scratches or adherence of dust, etc., the overall amplitude of RF signal Srf decreases. As shown in FIG. 7b, top-hold signal Sth and bottom-hold signal Sbh are kept to almost a constant signal level during period T2 because the droop rate is low for peak-hold circuits (101) and (103). Consequently, the signal level of defect detection threshold signal Sdt obtained by voltage dividing at a prescribed proportion using voltage divider (105) is kept constant during period T2. When the intensity of the reflected light falls, the signal level of top envelope signal Ste decreases. However, when said constant defect detection threshold signal Sdt decreases, as shown in FIG. 7c, defect detection signal Sd goes high (with a logic value of "1"), and the defect on the optical disc is detected.

The track pitch of DVD is 0.74 $\mu$m, less than half of 1.6 $\mu$m of CD. On the other hand, the wavelength of the laser beam used for regeneration of DVD is 650 nm, about 20% shorter than the wavelength of 780 nm for CD. Consequently, the ratio of light spot diameter to the track pitch of DVD is larger than that of CD. Also, since the pitch width of DVD is 0.3 $\mu$m, larger than half of the pitch width of 0.5 $\mu$m of CD, the ratio of the width of the mirror portion to the track pitch of DVD is smaller than that of CD. That is, even when the light spot is at the center of the mirror portion of a DVD, the intensity of the reflected light modulated by the pitch of the adjacent track is increased more than that in a CD. Consequently, the amplitude of RF signal Srf is larger, and the difference in the bottom level between the mirror portion and the track portion is smaller. That is, the amplitude of bottom envelope signal Sbe decreases.

Figure 8A:
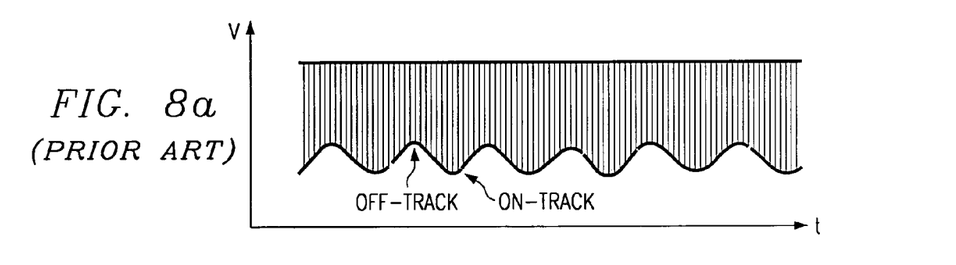
FIG. 8 is a waveform diagram illustrating difference in the RF signal between CD and DVD.
Figure 8B:
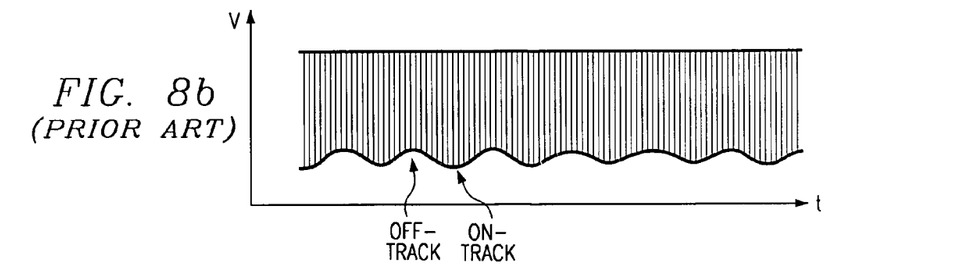

FIG. 8a illustrates waveform example of RF signal Srf of CD. FIG. 8b illustrates waveform example of RF signal Srf of DVD. As can be seen from these figures, the difference in the bottom level between the case when the light spot is at the center of the track (on-track) and the case when it is at the center of the mirror portion (off-track) of DVD is less than that in a CD. Consequently, in comparator (109), a sufficient level difference for performing the comparison operation may not be obtained. For example, when the overall amplitude of RF signal Srf decreases as shown in period T1 of FIG. 6 due to smudges, etc., on the disc surface, the sensitivity of mirror detection on DVD deteriorates significantly, and it may be impossible to perform normal track jumping for regeneration. That is, in mirror detecting circuit (200a) shown in FIG. 5, the track pitch of DVD, etc., becomes narrower, and the mirror detection sensitivity of the optical disc deteriorates. Consequently, due to noise and smudges on the disc, the mirror portion may be difficult to detect, which is undesirable.

In the following, other conventional mirror detecting circuits for solving the aforementioned problems of mirror detecting circuit (200a) shown in FIG. 5 will be explained.

Figure 9:
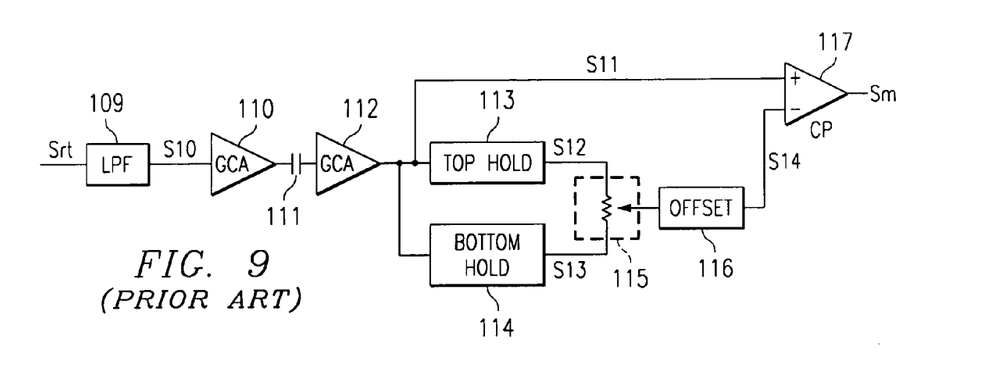
FIG. 9 is a schematic block diagram illustrating an example of constitution of the conventional mirror detecting circuit.

FIG. 9 is a block diagram illustrating schematically another structural example of the conventional mirror detecting circuit.

As shown in FIG. 9, mirror detecting circuit (300) has low-pass filter (109), gain control amplifier (110), gain control amplifier (112), capacitor (111), peak-hold circuit (113), peak-hold circuit (114), voltage divider (115), offset circuit (116) and comparator (117).

Low-pass filter (109) removes the modulation component in the high-frequency region of input RF signal Srf, and extracts the signal component that varies corresponding to the track and mirror portion and outputs it to gain control amplifier (110) when the light spot passes over the tracks.

Gain control amplifier (110) amplifies signal S10 output from low-pass filter (109) with a prescribed gain, and outputs it to capacitor (111). The gain of gain control amplifier (110) is set corresponding to the type of optical disc evaluated by an optical disc type evaluation circuit (not shown in the figure).

Capacitor (111) removes DC component from the signal output by gain control amplifier (110), and outputs the AC component to gain control amplifier (112).

Gain control amplifier (112) amplifies the output signal of gain control amplifier (110) without the DC component, with a prescribed gain, and outputs the amplified signal to comparator (117), peak-hold circuit (113) and peak-hold circuit (114). The gain of gain control amplifier (112) is determined in accordance with the type of optical disc evaluated by said optical disc type evaluation circuit.

Peak-hold circuit (113) holds the top level of signal S11 output from gain control amplifier (112) at a prescribed droop rate, and outputs it to voltage divider (115).

Peak-hold circuit (114) holds the bottom level of signal S11 output from gain control amplifier (112) at a prescribed droop rate, and outputs it to voltage divider (115).

Voltage divider (115) voltage-divides, in a prescribed ratio, signal S12 of the top level of signal S11 held by peak-hold circuit (113) and signal S13 of the bottom level of signal S11 held by peak-hold circuit (114), and outputs the voltage-divided signal to offset circuit (116).

Offset circuit (116) outputs mirror detection through signal S14 that gives the prescribed offset to the voltage divided signal from voltage divider (115) to comparator (117).

Comparator (117) compares output signal S11 of gain control amplifier (112) and mirror detection threshold signal S14 from the offset circuit, and outputs high-level mirror detection signal Sm when output signal S11 is above mirror detection threshold signal S14, and outputs low-level mirror detection signal Sm when output signal is below mirror detection threshold signal.

The operation of mirror detecting circuit (300) shown in FIG. 9 with the aforementioned constitution will be explained below.

FIG. 10 is a waveform diagram illustrating the operation of mirror detecting circuit (300) shown in FIG. 9. In this figure, the ordinate represents the signal level, and the abscissa represents time.

Figure 10A:
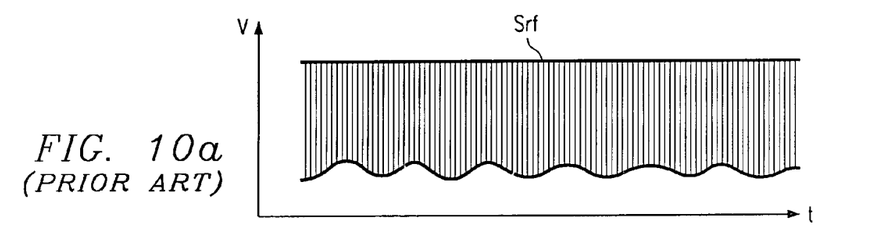
FIG. 10 is a waveform diagram illustrating the operation of the mirror detecting circuit shown in FIG. 9.
Figure 10B:
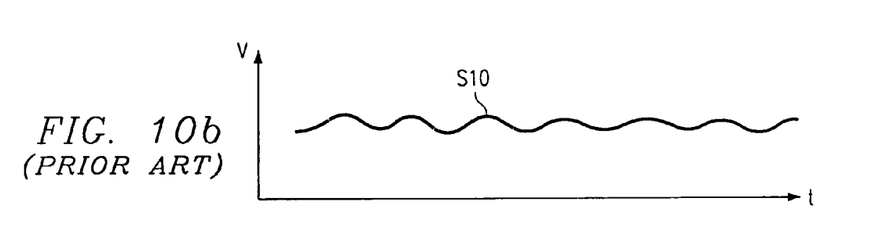

FIG. 10a illustrates waveform example of RF signal Srf input to low-pass filter (109). FIG. 10b illustrates the waveform of signal S10, with the high-frequency modulation component contained in said RF signal Srf removed by low-pass filter (109). After signal S10 is amplified by gain control amplifier (110), the DC component is removed by capacitor (111), and the resulting signal is input to gain control amplifier (112).

Figure 10C:
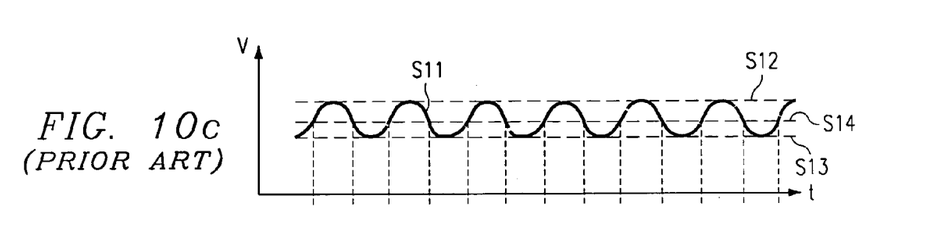
Figure 10D:
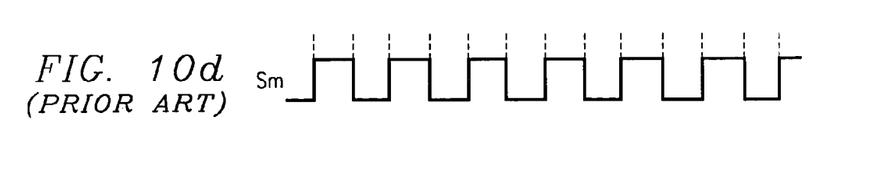

FIG. 10c illustrates the waveforms of signal S12 that holds the top level of signal S11 output from gain control amplifier (112), signal S13 that holds the bottom level, and mirror detection threshold signal S14 that is obtained by voltage-dividing said top level signal S12 and bottom level signal S13 using said voltage divider. As shown in FIG. 10d, mirror detection signal Sm goes high when the level of signal S11 is above the level of mirror detection threshold signal S14, and it goes low when the level of signal is below the level of mirror detection threshold signal.

In mirror detecting circuit (300) shown in FIG. 9, variations in amplitude corresponding to the track and mirror portions contained in RF signal Srf can be amplified to an appropriate level by gain control amplifiers (110) and (112), and the level difference in the signal input to the comparator in the last stage can be increased. In this way, it is possible to increase the mirror detection sensitivity as compared with mirror detecting circuit (200a) shown in FIG. 5.

However, mirror detecting circuit (300) of FIG. 9 has the following problems.

FIG. 11 is a waveform diagram illustrating the problems of mirror detecting circuit (300) shown in FIG. 6.

Figure 11A:
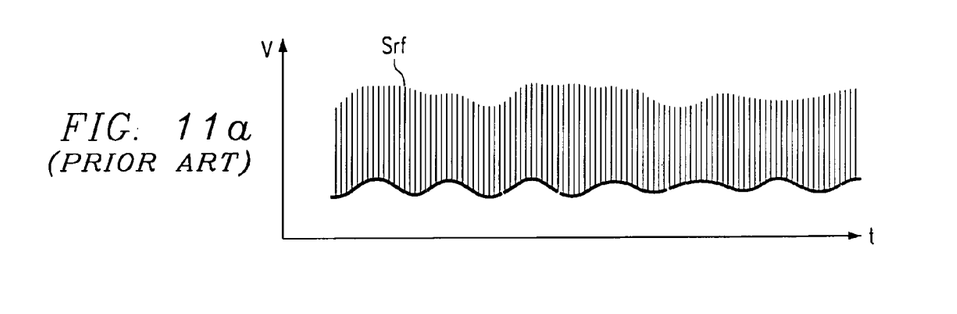
FIG. 11 is a waveform diagram illustrating problems in the mirror detecting circuit shown in FIG. 9.

FIG. 11a is a diagram illustrating a waveform example of input RF signal Srf. In this example, a vibrational component other than the amplitude component corresponding to the track and mirror portions at the bottom level appears at the top level of RF signal Srf. As shown in this waveform example, when the top level vibrates with a frequency component near the vibrational component at the bottom level, signal S10 output from low-pass filter (109) becomes a signal which has the signal component at the top level, which is undesirable for mirror detection, overlapped on the vibrational component of the bottom level. In this way, detection of the mirror portion becomes difficult, which is undesirable.

Figure 11B:
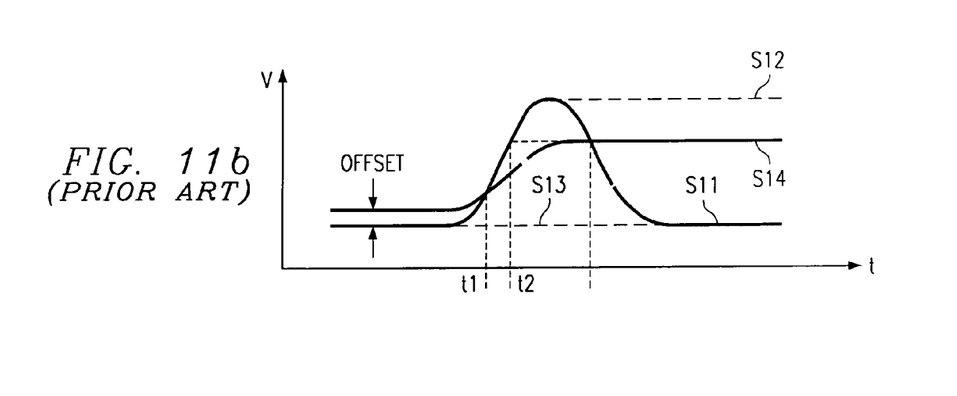
Figure 11C:
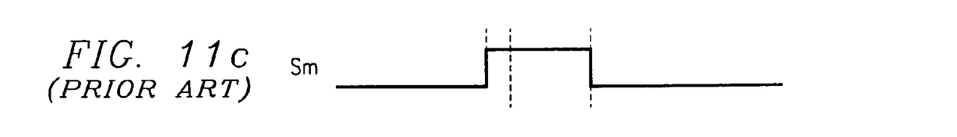

FIG. 11b illustrates waveforms of output signal S11 of gain control amplifier (112), top-hold signal S12, bottom-hold signal S13, and mirror detection threshold signal S14 in the case of single-track jump operation for only one track. As shown in FIG. 11b, when the single-track jump operation is performed, at the initial stage, the signal level held by peak-hold circuits (113) and (114) is still at the bottom level. Consequently, at time t1 before rise of mirror detection threshold signal S14 to the steady state, the level of signal S11 exceeds mirror detection threshold signal S14, and mirror detection signal Sm rises to the high level, as shown in FIG. 11c.

Figure 11D:
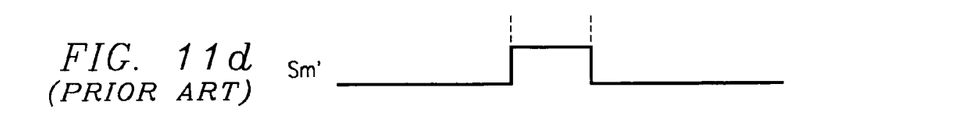

On the other hand, when a jump operation is performed over multiple tracks, at time t2 when mirror detection threshold signal S14, that has risen to the steady state, exceeds signal S11, as shown in FIG. 11d, mirror detection signal Sm' rises. Consequently, compared with the case of a multiple-track jump operation, in a single-track jump operation, mirror detection signal Sm rises faster, which is undesirable. Mirror detection signal Sm is used not only in counting the number of tracks, but also in controlling the braking movement of the optical pickup on the target track. Consequently, detection error of mirror detection signal Sm influences the braking control, so that it may be impossible for the optical pickup to stop on the target track.

A general object of the present invention is to solve the aforementioned problems of the conventional methods by providing a mirror detection signal generator that can detect the mirror portion with high stability, independently of the type of the optical recording medium.

SUMMARY OF THE INVENTION

In accordance with one aspect of the present invention, a type of mirror detection signal generator, is provided having a mirror detection signal generator, which generates a mirror detection signal from RF signal corresponding the reflected light from a medium, comprises the following parts: a first peak-hold circuit that holds the bottom level of said RF signal at a first attenuation rate and outputs a bottom-hold signal; a second peak-hold circuit that holds the top level of said RF signal at a second attenuation rate and outputs a first envelope signal; a third peak-hold circuit that holds the bottom level of said RF signal at a third attenuation rate and outputs a second envelope signal; a first reference signal generator that outputs the first reference signal generated on the basis of said bottom-hold signal and said first envelope signal; and a first comparator that compares said first reference signal with said second envelope signal and generates said mirror detection signal.

The mirror detection signal generator preferably has a first voltage divider that generates the divided voltage of said bottom-hold signal and said first envelope signal. Said first reference signal generator also preferably has a first amplifier that amplifies said divided voltage at an amplification rate corresponding to the type of recording medium. In addition, said first reference signal generator preferably has an offset circuit that adds a prescribed offset voltage to the output signal of said first amplifier.

Also, in accordance with another aspect of the invention, the mirror detection signal generator has a filter that performs a prescribed signal processing function on said second envelope signal, and a second amplifier that amplifies said second envelope signal at an amplification rate corresponding to the type of recording medium.

In addition, in accordance with yet another aspect of the invention the mirror detection signal generator has a fourth peak-hold circuit that holds the top level of said RF signal at a fourth attenuation rate and outputs a top-hold signal, a second reference signal generator that outputs the second reference signal generated on the basis of said top-hold signal and said bottom-hold signal, and a second comparator that compares said second reference signal and said first envelope signal and generates a defect detection signal.

Also, the mirror detection signal generator of the present invention preferably has a second voltage divider that generates the divided voltage of said top-hold signal and said bottom-hold signal. In addition, the mirror detection signal generator of the present invention preferably has a third amplifier that amplifies the divided voltage output from said second voltage divider at an amplification rate corresponding to the type of recording medium. Besides, the mirror detection signal generator of the present invention preferably has a fourth amplifier that amplifies said first envelope signal at an amplification rate corresponding to the type of recording medium.

With the mirror detection signal generator of the present invention, it is possible to perform stable detection of the mirror portion independently of the type of the optical recording medium, and it is possible to perform a single-track jump operation with good reliability.

REFERENCE NUMERALS AND SYMBOLS AS SHOWN IN THE DRAWINGS

In the figures, 1 is a Optical disc 2 is a Disc motor, 3 is a Head portion, 4 is a RF signal processing unit, 5 is a Regenerating unit, 6 is a Servo control unit, 7 is a System control unit, 11–14 are Peak-hold circuits, 15, 16 are Voltage dividers, 17–20 are Gain control amplifiers, 21 is a Low-pass filter, 22 is a Offset circuit, 23, 24 are Comparators, 10 is an Optical disc egenerating apparatus, 100a is a Mirror detecting circuit, and 100b is a Defect detecting circuit.

DESCRIPTION OF THE EMBODIMENTS

In the following, an embodiment of the present invention will be explained with reference to FIGS. 1–4.

Figure 1:
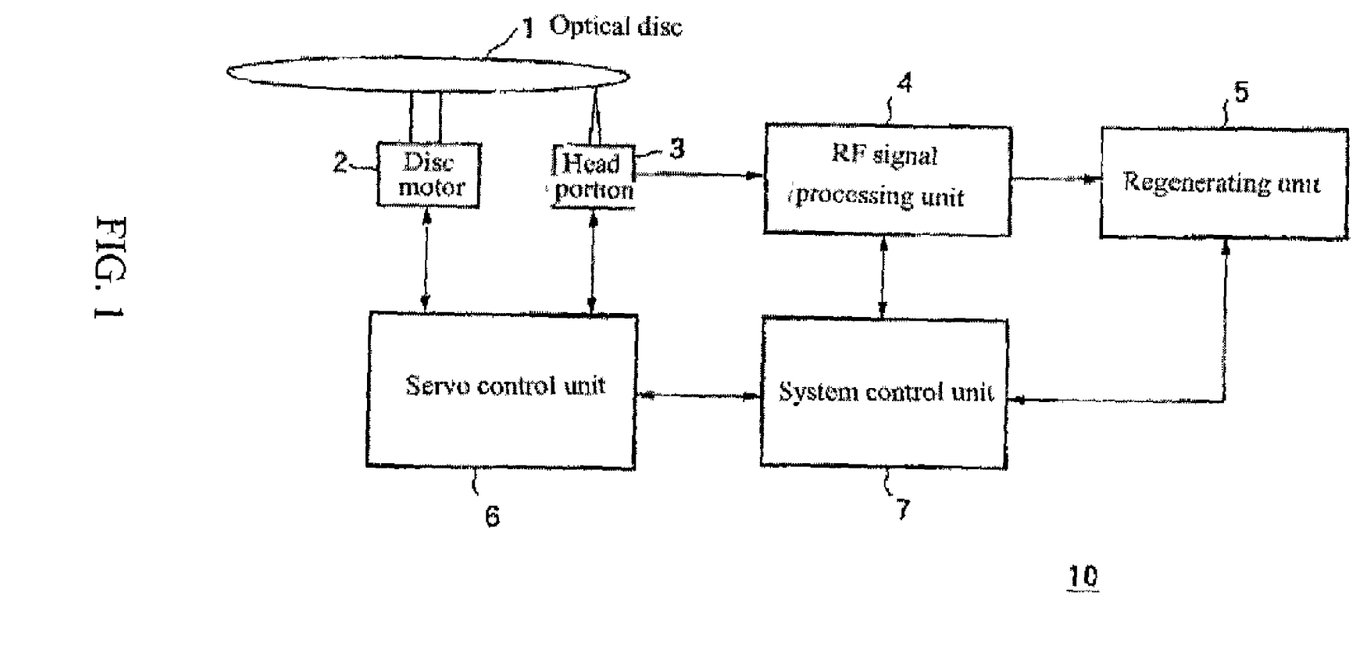
FIG. 1 is a schematic block diagram illustrating the optical disc regenerating apparatus in an embodiment of the present invention.

FIG. 1 is a schematic block diagram illustrating the optical disc regenerating apparatus pertaining to the embodiment of the present invention.

As shown in FIG. 1, optical disc regenerating apparatus (10) has disc motor (2), head unit (3), RF signal processing unit (4), regenerating unit (5), servo control unit (6), and system control unit (7).

Disc motor (2) holds loaded CD, DVD or other optical disc (1), and it rotates optical disc (1) at a rotational velocity corresponding to the control from servo control unit (6).

Head unit (3) has a laser oscillator for irradiating optical disc (1), an optical system that irradiates said laser beam, an optical detector that detects light received by said optical system and converts it into an electronic signal, an RF signal amplifier that amplifies the signal from said optical detector, a circuit that generates a focus error signal and a tracking error signal from the amplified RF signal and outputs the signals to servo control unit (6), etc. In this way, the laser beam can be irradiated on optical disc (1), the reflected light received, the received light converted into an RF signal, the RF signal amplified, the focus error signal, tracking error signal, and other signals for servo-control can be generated from the amplified RF signal, etc. Also, an actuator, etc., is used to move the optical system in the laser beam irradiating direction and radial direction of the optical disc corresponding to the control signal from servo control unit (6). In this way, the laser beam can be focused on the desired location of optical disc (1), and the light reflected from the optical disc received.

RF signal processing unit (4) has a circuit that converts the RF signal input from head unit (3) into a binary signal with shaped waveform and regenerates a clock signal synchronized with said binary signal, a mirror detecting circuit, a defect detecting circuit for the disc, etc. In this way, the RF signal can be converted into a binary signal, the mirror portions and defects of optical disc (1), can be detected, etc.

Regenerating unit (5) is a block that processes the binary digital signal and regenerates the desired information in RF signal processing unit (4). For example, for a DVD player or the like, the binary data modulated by the 8–16 system is demodulated, the data is error corrected for regeneration of the data stream, and the sound and image from the audio data and video data separated from the data stream can be regenerated.

Servo control unit (6) controls the actuator of disc motor (2) and head unit (3) in order to control the rotational velocity of the disc and the laser beam irradiation location. For example, corresponding to the position in the radial direction of the disc of head unit (3), the rotational velocity of the disc is under servo control, so that the data reading rate can be held constant both on the inner peripheral side and on the outer peripheral side of the disc. When a jump track instruction is input from system control unit (7), head unit (3) is moved in the radial direction of the disc, and the laser beam spot is moved to the desired track. Also, corresponding to the focus error signal and tracking error signal input from head unit (3), the actuator of head unit (3) is under servo control, so that the focus and track scanning errors of the laser beam can be corrected, and the system kept in a state in which the recorded data can be read reliably.

System control unit (7) performs various control operations pertaining to the entire system, such as evaluation of the type of disc, control associated with mirror detection and defect detection in RF signal processing unit (4), regeneration processing of the binary data in regenerating unit (5), driving of disc motor (2) and head unit (3) by servo control unit (6), etc.

The operation of the optical disc regenerating apparatus with the aforementioned constitution will be explained below.

When optical disc (1) is loaded, before regenerating the recorded data, optical disc (1) is evaluated to determine the type. First, an instruction for scanning focus is output from system control unit (7) to servo control unit (6). In this way, the focus position of head unit (3) is scanned in the direction perpendicular to the recording surface. At this time, the RF signal is input to RF signal processing unit (4), and the small variations in the amplitude of the RF signal are detected and output to system control unit (7). In system control unit (7), from the focus position at the time when variation in amplitude of the RF signal is detected, the type of optical disc (1) is evaluated. This evaluation system exploits the fact that the depth from the transparent resin layer on the surface of the optical disc to the recording layer of CD is different from that of DVDs or other optical disc.

The aforementioned disc evaluation system is merely an example. Other evaluation systems can also be adopted corresponding to the specifications of optical discs. For example, when the optical disc type can be determined from its shape, a sensor that detects the shape of the disc can be used.

After the type of optical disc (1) is evaluated by system control unit (7), gain and detection threshold, filter frequency characteristics, etc., in the mirror detecting unit and defect detecting unit of RF signal processing unit (4) are set corresponding to the determined type of optical disc. Details of this operation will be explained below.

When the recorded data on optical disc (1) are read, the settings for the rotational velocity of the disc, the position of the laser beam spot, the focusing of the laser beam, etc., are output from system control unit (7) to servo control unit (6). In accordance with the settings, the actuator for disc motor (2) and head unit (3) is servo-controlled with the focusing error signal and tracking error signal of head unit (3) used as feedback signals. In this way, the laser beam spot can safely scan the tracks of optical disc (1). The reflected laser light received by the optical system of head unit (3) is converted into RF signal by the optical detection circuit. In addition, after it is amplified by RF signal amplifier, it is output to RF signal processing unit (4). In RF signal processing unit (4), the RF signal is converted into binary signal by waveshaping, and it is regenerated to the desired information in regenerating unit (5).

In the case of track jumping, the actuator is controlled by servo control unit (6) so that head unit (3) is slid in the radial direction of the disc toward the targeted track. In this case, the number of pulses of the mirror detection signal output from the mirror detecting circuit of RF signal processing unit (4) is counted by system control unit (7), so that the number of the tracks that have been jumped is determined. When it is determined that the optical spot has reached the target track from the counting result, the sliding movement of head unit (3) is subject to braking control, and the position of head unit (3) is controlled so that the light spot irradiates the center of the target track.

The mirror detecting circuit and the defect detecting circuit contained in said RF signal processing unit (4) will be examined below.

Figure 2:
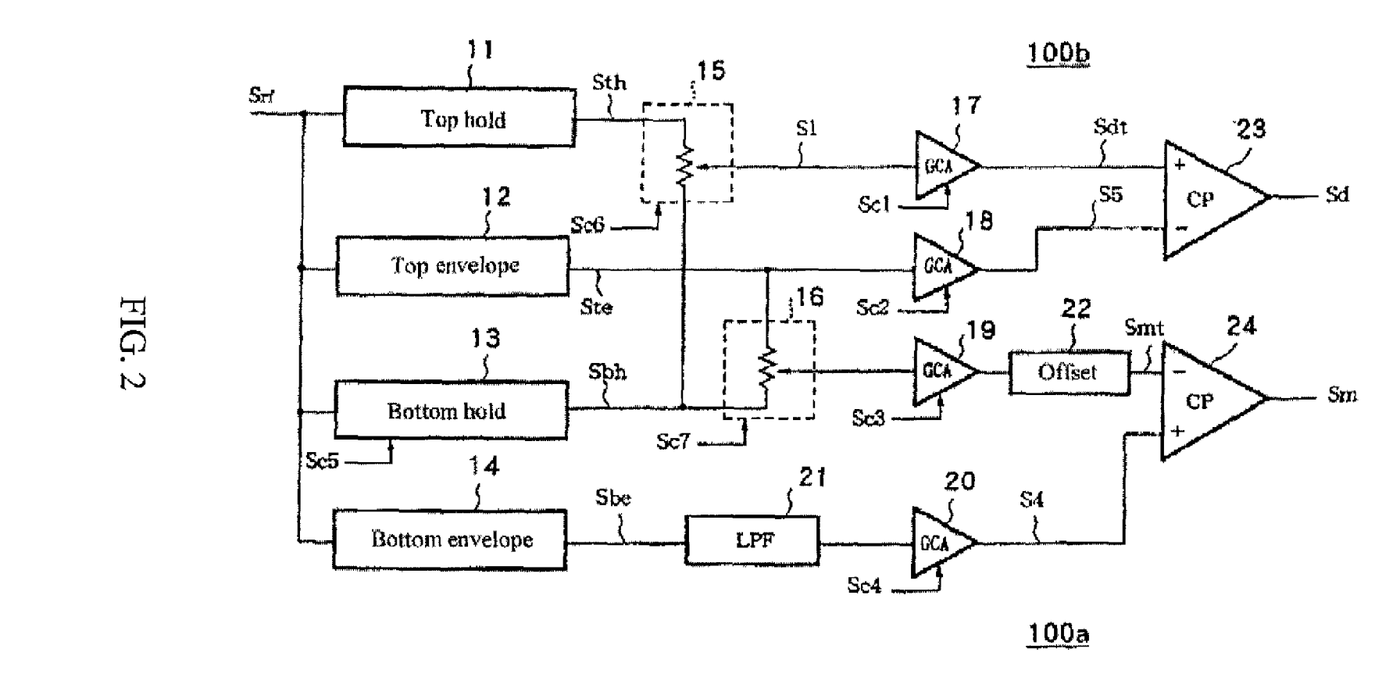
FIG. 2 is a schematic block diagram illustrating the mirror detecting circuit and defect detecting circuit in the embodiment of the present invention.

FIG. 2 is a schematic block diagram illustrating the mirror detecting circuit and defect detecting circuit in the embodiment of the present invention.

Mirror detecting circuit (100a) shown in FIG. 2 has peak-hold circuits (12)–(14), voltage divider (16), low-pass filter (21), gain control amplifiers (19) and (20), offset circuit (22) and comparator (24). Also, defect detecting circuit (100b) shown in FIG. 2 has peak-hold circuit (11), voltage divider (15), gain control amplifiers (17) and (18), and comparator (23). Peak-hold circuits (12) and (13) are shared with mirror detecting circuit (100a).

Peak-hold circuits (11)–(14) are circuits that hold the top level or bottom level of RF signal Srf obtained as the electronic signal converted from the optical detector in head unit (3). Peak-hold circuits (11) and (12) hold the top level of RF signal Srf, and peak-hold circuits (13) and (14) hold the bottom level of RF signal Srf.

Also, the droop rate of each peak-hold circuit is set individually. The properties of the signals held in the various peak-hold circuits differ on the basis of the values of the droop rates.

Peak-hold circuit (11) is set to a relatively low droop rate in order to keep a constant droop rate of RF signal Srf. For example, a droop rate of about 1 msec/V may be used. Also, generated top-hold signal Sth is output to voltage divider (15).

In order to output a signal corresponding to the envelope described by the top level of RF signal Srf, peak-hold circuit (12) is set to a droop rate greater than that of peak-hold circuit (11). For example, a droop rate of about 100 µsec/V may be set. Also, top envelope signal Ste is output to voltage divider (16) and gain control amplifier (18).

In order to hold the bottom level of RF signal Srf constant, peak-hold circuit (13) is set to a relatively low droop rate. For example, a droop rate of about 10 msec/V, less than that of peak-hold circuit (11), may be used. Also, generated bottom-hold signal Sbh is output to voltage divider (16).

In order to output a signal corresponding to the envelope described by the bottom level of RF signal Srf, peak-hold circuit (14) is set to a droop rate above those of peak-hold circuits (12) and (13). For example, a droop rate of about 10 μsec/V may be used. Also, generated bottom envelope signal Sbe is output to low-pass filter (21).

Also, the droop rate of peak-hold circuit (13) may change corresponding to droop rate setting signal Sc5 from system control unit (7). This droop rate is usually higher than that when defects on the optical disc are detected, as will be explained below. Consequently, the response of the hold signal to rapid changes in the bottom level is faster.

Also, the droop rate of the other peak-hold circuits may also be changed by means of system control unit (7). In this way, it is possible to set appropriate droop rates for the various peak-hold circuits in accordance with the evaluation of the type of optical disc (1), as well as the regeneration rate, and other parameters.

Low-pass filter (21) is a filter that removes the high-frequency noise component contained in bottom envelope signal She output from peak-hold circuit (14). Also, the frequency band may be changed under the control of system control unit (7) corresponding to the type of optical disc (1), regeneration rate, and other regeneration parameters. In this way, it is possible to set an appropriate trade-off between the removal of the noise component and response speed of the envelope signal.

Voltage divider (15) outputs the signal, which is obtained by voltage division, at a prescribed ratio, of top-hold signal Sth output from peak-hold circuit (11) and bottom-hold signal Sbh output from peak-hold circuit (13) to gain control amplifier (17). Also, the voltage-divider ratio is changed corresponding to the voltage-divider ratio setting signal Sc6 from system control unit (7). This voltage-divider ratio is set for each type of optical disc (1) to be evaluated.

Voltage divider (16) outputs the signal, which is obtained by voltage division, at a prescribed ratio of top envelope signal Ste output from peak-hold circuit (12) and bottom-hold signal Sbh output from peak-hold circuit (13) to gain control amplifier (19). Also, the voltage-divider ratio is changed corresponding to voltage-divider ratio setting signal Sc7 from system control unit (7). This voltage-divider ratio is set for each type of optical disc (1) to be evaluated.

Gain control amplifier (17) amplifies voltage division signal S1 output from voltage divider (15) with a gain that corresponds to gain setting signal Sc1 from system control unit (7). The amplified signal is input as defect detection threshold signal Sdt to the positive terminal of comparator (23).

Gain control amplifier (18) amplifies top envelope signal Ste output from peak-hold circuit (12) with a gain that corresponds to gain setting signal Sc2 from system control unit (7), and the amplified signal is input to the negative terminal of comparator (23).

Gain control amplifier (19) amplifies voltage division signal S2 output from voltage divider (16) with a gain that corresponds to gain setting signal Sc3 from system control unit (7), and the amplified signal is input to offset circuit (22).

Gain control amplifier (20) amplifies envelope signal S3 on the bottom level output from low-pass filter (21) with a gain that corresponds to gain control signal Sc4 from system control unit (7), and the amplified signal is output to the positive terminal of comparator (24).

Also, usually, gain control amplifiers (19) and (20) have the same gain, and gain control amplifiers (17) and (18) also have the same gain. However, different values for these gains may also be used, as is appropriate.

Offset circuit (22) adds a prescribed offset to the voltage division signal output from gain control amplifier (19), and the obtained signal is input as mirror detection threshold signal Smt to the negative terminal of comparator (24).

Comparators (23) and (24) compare the magnitudes of the signal level input to the positive terminal and that input to the negative terminal, so that when the signal level at the positive terminal is above that at the negative terminal, a signal with a logic value of "1" is output, and when the signal level at the positive terminal is below that on the negative terminal, a signal with a logic value of "0" is output.

Comparator (23) outputs defect detection signal Sd with a logic value of "1," which indicates the detection of a defect when the level of top envelope signal S5 amplified by gain control amplifier (18) is below that of defect detection threshold signal Sdt.

Comparator (24) outputs mirror detection signal Sm with a logic value of "1," which indicates the detection of the mirror portion when the level of envelope signal S4 on the bottom level amplified by gain control amplifier (20) is above mirror detection threshold signal Smt.

The operation of mirror detecting circuit (100a) and defect detecting circuit (100b) with the aforementioned constitution will be explained below.

In mirror detecting circuit (100a), voltage division of top envelope signal Ste and bottom-hold signal Sbh of RF signal Srf is performed using voltage divider (16) to generate voltage division signal S2 having a signal level of a prescribed proportion between said signals. After this voltage division signal S2 is amplified by gain control amplifier (19) with a gain that corresponds to the type of optical disc (1), a prescribed offset is added by offset circuit (22), and the resulting signal is input as mirror detection threshold signal Smt to the negative terminal of comparator (24). On the other hand, the noise component in the high-frequency region of bottom envelope signal Sbe of RF signal Srf is removed by low-pass filter (21) and amplified by gain control amplifier (20) with a gain that corresponds to the type of optical disc (1). Then, the amplified signal is input to the positive terminal of comparator (24). When the level of said amplified bottom envelope signal S4 is above mirror detection threshold signal Smt, mirror detection signal Sm with a logic value of "1," which indicates detection of a mirror portion, is output from comparator (24).

In defect detecting circuit (100b), voltage division of top-hold signal Sth and bottom-hold signal Sbh of RF signal Srf is performed by voltage divider (15) to generate voltage division signal S1 with a signal level with a prescribed proportion between said signals. After said voltage division signal S1 is amplified by gain control amplifier (17) with a gain that corresponds to the type of optical disc (1), the amplified signal is input as defect detection threshold signal Sdt to the positive terminal of comparator (23). On the other hand, after top envelope signal Ste of RF signal Srf is amplified by gain control amplifier (18) with a gain that corresponds to the type of optical disc (1), it is input to the negative terminal of comparator (23). When said amplified top envelope signal S5 is below defect detection threshold signal Sdt, defect detection signal Sd with a logic value of "1," which indicates detection of defect of optical disc (1), is output from comparator (23).

When the light spot passes over the region of an optical disc with a reduced light intensity due to the presence of fingerprints, smudges, etc., the overall amplitude of RF signal Srf is reduced. However, in this case, since the amplitudes of top envelope signal Ste and of bottom envelope signal Sbe are proportionally reduced, the signal level of mirror detection threshold signal Smt also decreases by the same proportion. That is, even when the amplitude of the envelope signal of the bottom level decreases due to the decrease in the intensity of the reflected light caused by smudges, etc., the level of mirror detection threshold signal Smt decreases proportionally with the amplitude, and mirror detection can be performed. Consequently, it is possible to suppress the decrease in the mirror detection sensitivity with respect to smudges on the disc surface, and it is possible to perform mirror detection reliably.

Similarly, in defect detecting circuit (100b), when the overall amplitude of RF signal Srf decreases due to the presence of smudges on the surface of the disc, the level of top-hold signal Sth and the level of top envelope signal Ste decrease at the same proportion, so that it is also possible to suppress variations in the relative threshold level for the detection of defects, and it is possible to perform defect detection reliably.

In addition, because voltage division signal S2 and bottom envelope signal S3 are amplified with a gain that corresponds to the type of optical disc (1), even when jump regeneration is performed for an optical disc, such as a DVD, which has a lower level of bottom envelope signal S3 than a CD, it is possible to set a higher gain for gain control amplifiers (19) and (20) so as to suppress the decrease in the signal level difference input to comparator (24). Consequently, it is possible to suppress the decrease in the detection sensitivity of the mirror portion, and to realize mirror detection reliably.

Similarly, in defect detecting circuit (100b), since voltage division signal S1 and top envelope signal Ste are amplified with a gain that corresponds to the type of optical disc (1), even when the amplitude of RF signal Srf is relatively low for an optical disc, it is still possible to reliably detect optical disc errors.

Also, for defect detecting circuit (100b), when defect detection signal Sd has logic value of "1," droop rate setting signal Sc5 that sets a droop rate for peak-hold circuit (13) above the conventional value is output by system control unit (7), which detects said state. By means of said droop rate setting signal Sc5, during the period when defect detection signal Sd has a logic value of "1," the droop rate of peak-hold circuit (13) is increased.

Figure 3:
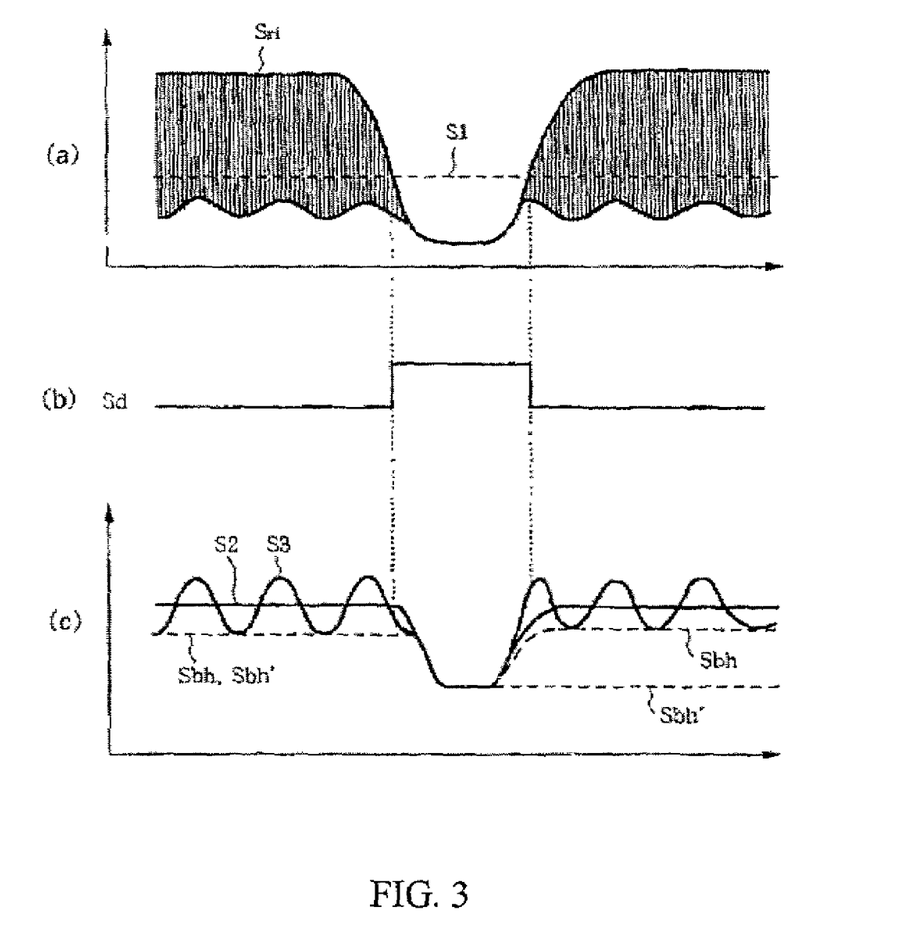
FIG. 3 is a waveform diagram that shows the bottom-hold signal in the portion of an optical disc that contains a defect.

FIG. 3 is a waveform diagram illustrating bottom-hold signal Sbh in the defective region of an optical disc. In this figure, the ordinate represents the signal level and the abscissa represents time.

FIG. 3a illustrates the waveforms of RF signal Srf and voltage division signal S1 when the light spot passes over the defective region of the optical disc. FIG. 3b illustrates the waveform of defect detection signal Sd that changes from a logic value of "0" to logic value of "1" in accordance with the presence of a defect. FIG. 3c shows waveforms of bottom-hold signal Sbh, voltage division signal S2 and bottom envelope signal S3 when the droop rate of peak-hold circuit (13) is increased, as compared with the waveform of bottom-hold signal Sbh' when the droop rate is not increased.

As can be seen from FIG. 3a, when the intensity of reflected light decreases significantly due to the presence of a defect, etc., on the optical disc, and the top level of RF signal Srf is lower than the bottom level in the normal state, bottom-hold signal Sbh' that keeps the lower droop rate as is in the normal state keeps the level as is when a defect is detected even after a defect is detected as shown in FIG. 3c. Consequently, the level of mirror detection threshold signal Smt remains low, and normal mirror detection cannot be performed. On the other hand, for mirror detecting circuit (100a) shown in FIG. 2, when defect detection signal Sd has a logic value of "1," the droop rate of peak-hold circuit (13) is increased. Consequently, as shown in FIG. 3c, mirror detection threshold signal Smt quickly returns to the level of the normal state after returning of defect detection signal Sd to logic value of "0." Thus, it is possible to minimize the disabled mirror detection state after defect detection.

Also, the noise component contained in bottom envelope signal Sbe, which is undesirable for mirror detection, is removed by low-pass filter (21) of mirror detecting circuit (100a) shown in FIG. 2. Consequently, it is possible to remove glitches from mirror detection signal Sm caused by the noise component that is generated when single data units are long and composed of adjacent, continuously recorded tracks.

Figure 4:
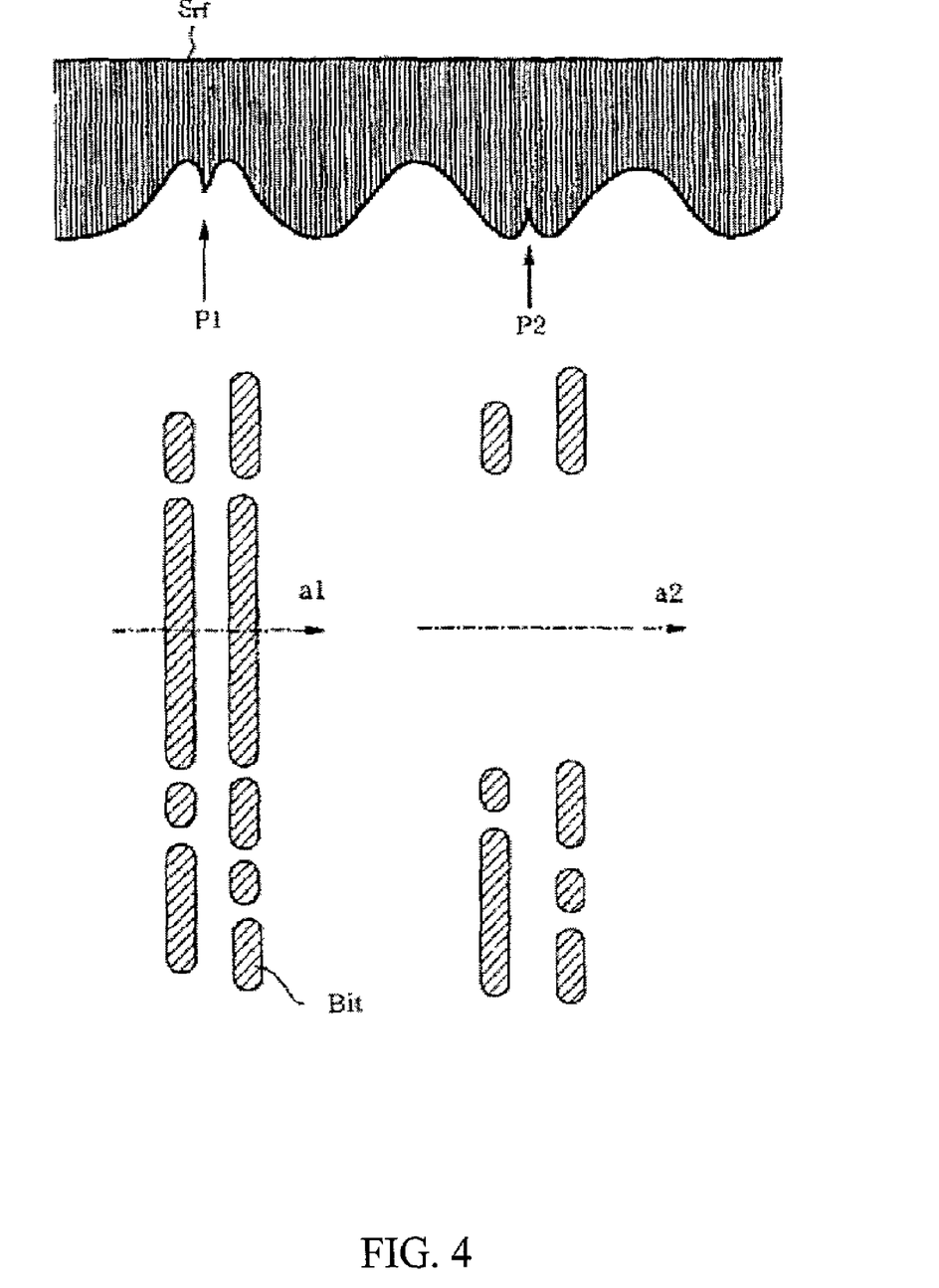
FIG. 4 is a waveform diagram illustrating the noise of RF signal that is generated when the light spot traverses adjacent tracks of value "1" or "0" recorded continuously.

FIG. 4 is a waveform diagram illustrating noise in RF signal Srf that is generated when the light spot passes over adjacent tracks on which are continuously recorded "1" or "0." For example, when bit portions on adjacent tracks are continuous, due to the decrease in the reflected light by said bit portion, a downward glitch appears at peak position P1 of the bottom envelope. Also, when portions without bits, that is, mirror portions, are continuous on the adjacent tracks, due to increase in the reflected light from such mirror portions, upward glitches appear at peak position P2 of the bottom envelope. In mirror detecting circuit (100a) shown in FIG. 2, since said noise component can be effectively removed by low-pass filter (21), it is possible to realize stable mirror detection.

As explained above, by means of mirror detecting circuit (100a) shown in FIG. 2, peak-hold circuit (13) holds the bottom level of RF signal Srf at the first droop rate and outputs bottom-hold signal Sbh. Peak-hold circuit (12) holds the top level of RF signal Srf at a second droop rate that is higher than the first droop rate and outputs top envelope signal Ste. Peak-hold circuit (14) holds the bottom level of RF signal Srf at a third droop rate that is higher than the second droop rate and outputs bottom envelope signal Sbe. Voltage divider (16) voltage-divides bottom-hold signal Sbh and top envelope signal Ste at a prescribed ratio, and outputs voltage division signal S2. In gain control amplifier (19), voltage division signal S2 is amplified by a first gain corresponding to gain setting signal Sc3 input from system control unit (7). Gain control amplifier (20) amplifies bottom envelope signal Sbe by a second gain corresponding to gain setting signal Sc4 input from system control unit (7). Voltage division signal S2 is amplified by gain control amplifier (19) and an offset is added to get mirror detection threshold signal Smt, which is compared with bottom envelope signal S4 amplified by gain control amplifier (20) at comparator (24). Mirror detection signal Sm is output corresponding to the result of said comparison.

Consequently, in the track jump operation of an optical disc, such as a DVD, where the RF signal level differences between the on-track and off-track states are smaller than in a CD, it is possible to improve the poor operation in mirror detection due to noise, etc. As a result, in the optical disc regenerating apparatus shown in FIG. 1, it the stability of the track jump operation, such as jump regeneration, searching, etc., can be improved Also, as noise shown in FIG. 4, noise due to the high-frequency component modulated by reflection from bits and other noise components undesirable for mirror detection are removed by low-pass filter (21), which removes the noise component contained in bottom envelope signal Sbe, so that it is possible to prevent poor mirror detection and to improve the stability of the track jump operation, such as jump regeneration, searching, etc.

Also, peak-hold circuit (11) holds the top level of RF signal Srf at a fourth droop rate that is above the first droop rate and below the second droop rate, and outputs top-hold signal Sth. Voltage divider (15) voltage-divides bottom-hold signal Sbh and top-hold signal Sth with a prescribed ratio, and outputs voltage division signal S1. Comparator (23) compares the amplified signal of said voltage division signal S1 with the amplified signal of top envelope signal Ste and outputs defect detection signal Sd corresponding to the result of said comparison. Corresponding to said defect detection signal Sd, the droop rate of peak-hold circuit (13) can be changed to the desired droop rate higher than the first droop rate.

Consequently, it is possible to prevent the holding of bottom-hold signal Sbh at the original level at the time of defect detection after the detection of a defect on the optical disc caused by scratches, etc., and it is possible to minimize the period of poor mirror detection operation after the detection of a defect.

Because it is possible to prevent the generation of problems in the mirror detecting operation caused by a vibrational component generated on the top level as would take place in conventional mirror detecting circuit (300) shown in FIG. 9, mirror detection can be performed more reliably than that in the conventional circuit shown in FIG. 9.

Also, in the single-cycle jump operation of only one track, mirror detection threshold signal Smt has no variation, and there is no change from the steady level in the jump operation over multiple tracks. Consequently, no errors occur in mirror detection signal Sm, as in mirror detection circuit (300) of FIG. 9, in the single-track jump operation. As a result, it is possible to perform stable braking control for head unit (3) that makes use of mirror detection signal Sm.

In addition, according to the present invention, since amplifiers are arranged between peak-hold circuits (11), (12), (13) and (14) and input terminals of comparators (23) and (24), respectively, to amplify the various signals, it is possible to detect the defect detection signal and mirror detection signal with good reliability. If the amplifiers are arranged in the section of peak-hold circuits (11), (12), (13), (14), it is necessary that they have a wide dynamic range. However, this is not required for the constitution of the present invention.

Also, the present invention is not limited to the aforementioned embodiment.

For example, the defect detecting circuit for switching the droop rate of peak-hold circuit (13) to a higher rate is not limited to the constitution shown in FIG. 2. Various other constitutions may be adopted as well.

Also, for the droop rates of peak-hold circuits (11)–(14), the voltage-division ratios of voltage dividers (15) and (16), the gains of gain control amplifiers (17)–(20), the band characteristics of low-pass filter (21), the offset added by offset circuit (22), and the offset and hysteresis characteristics of comparators (23) and (24), the constitution can be changed corresponding to the specific type of optical disc by means of system control unit (7), and fixed values for any of the above-mentioned circuits may be used.

What is claimed is:

1. A mirror detection signal generator,
which generates a mirror detection signal from an RF signal corresponding the reflected light from a recording medium, comprises the following parts:
a first peak-hold circuit that holds the bottom level of said RF signal and having a first droop rate and outputs a bottom-hold signal;
a second peak-hold circuit that holds the top level of said RF signal and having a second droop rate and outputs a first envelope signal;
a third peak-hold circuit that holds the bottom level of said RF signal and having a third droop rate and outputs a second envelope signal;
a first reference signal generator that outputs the first reference signal generated on the basis of said bottom-hold signal and said first envelope signal;
a first comparator that compares said first reference signal with said second envelope signal and generates said mirror detection signal;
a fourth peak-hold circuit that holds the top level of said RF signal and having a fourth droop rate and outputs a top-hold signal;
a second reference signal generator that outputs the second reference signal generated on the basis of said top-hold signal and said bottom-hold signal;
and a second comparator that compares said second reference signal and said first envelope signal and generates a defect detection signal, said first droop rate being controlled by said defect detection signal.

2. The mirror detection signal generator described in claim 1,
said first reference signal generator comprises a first voltage divider that divides the voltage of said bottom-hold signal and said first envelope signal.

3. The mirror detection signal generator described in claim 2,
said first reference signal generator comprises a first amplifier that amplifies said divided voltage at an amplification rate corresponding to the type of recording medium.

4. The mirror detection signal generator described in claim 3,
said first reference signal generator comprises an offset circuit that adds a prescribed offset voltage to the output signal of said first amplifier.

5. The mirror detection signal generator described in claim 1, further comprising
a filter that performs a prescribed signal processing for said second envelope signal, and
a second amplifier that amplifies said second envelope signal at an amplification rate corresponding to the type of recording medium.

6. The mirror detection signal generator described in claim 1;
said second reference signal generator comprises a second voltage divider that divides the voltage of said top-hold signal and said bottom-hold signal.

7. The mirror detection signal generator described in claim 6, wherein
said second reference signal generator comprises a third amplifier that amplifies the divided voltage output from said second voltage divider at an amplification rate corresponding to the type of recording medium.

8. The mirror detection signal generator described in claim 6 further comprising
a fourth amplifier that amplifies said first envelope signal at an amplification rate corresponding to the type of recording medium.

9. The mirror detection signal generator described in claim 1;
said first attenuation rate is increased when said defect detection signal is output.

10. The mirror detection signal generator described in claim 2, further comprising
a filter that performs a prescribed signal processing for said second envelope signal, and
a second amplifier that amplifies said second envelope signal at an amplification rate corresponding to the type of recording medium.

11. The mirror detection signal generator described in claim 3, further comprising
a filter that performs a prescribed signal processing for said second envelope signal, and
a second amplifier that amplifies said second envelope signal at an amplification rate corresponding to the type of recording medium.

12. The mirror detection signal generator described in claim 4, further comprising
a filter that performs a prescribed signal processing for said second envelope signal, and
a second amplifier that amplifies said second envelope signal at an amplification rate corresponding to the type of recording medium.

\* \* \* \* \*